Figure 2:
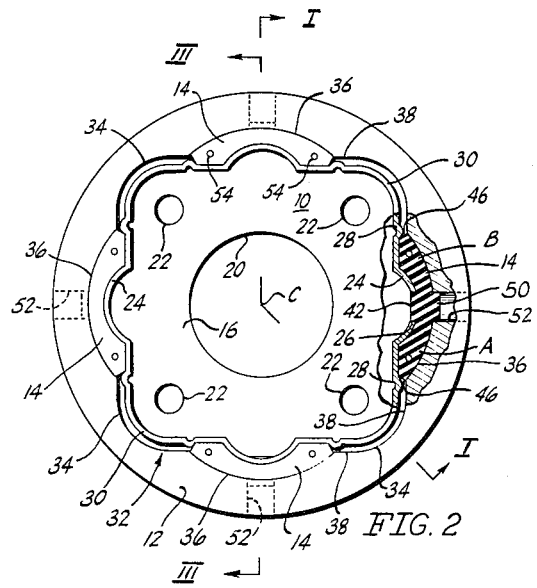

March 29, 1966 D. E. ARNT 3,242,766
VIBRATION DAMPER
Filed July 29, 1963

INVENTOR
DAVID E. ARNT
BY Beaman & Beaman
ATTORNEYS

United States Patent Office 3,242,766
Patented Mar. 29, 1966

3,242,766
VIBRATION DAMPER
David E. Arnt, Hillsdale, Mich., assignor to Hillsdale Tool and Manufacturing Company, Hillsdale, Mich., a corporation of Michigan
Filed July 29, 1963, Ser. No. 298,231
6 Claims. (Cl. 74—574)

The invention pertains to a vibration dampener, and particularly relates to a rotatable vibration dampener capable of dampening low frequency vibrations, such as those present in vehicle transmission, drive line, and differential components produced by gearing and the like.

In the interest of improving automobile performance, decreasing gear wear, and reducing the noise level occurring in vehicle drive components, rotatable vibration dampeners are being employed in vehicle drive lines. Such vibration dampeners are often mounted adjacent the vehicle rear axle differential on the differential pinion shaft. As the vibration frequency of vehicle drive lines is relatively low, prior vibration dampener constructions for this application, to be effective, are usually large and cumbersome, and as the vibration dampener for the drive line is usually mounted exteriorly on the drive line, the requirements for road clearance and underframe clearance limit the size of this type of dampener. Also, the exterior location of the vibration dampener places the dampener in a vulnerable location and requires a dampener of very rugged construction to resist possible damage due to the dampener engaging ruts, irregular road surfaces, and the like.

It is a basic object of the invention to provide a rotatable vibration dampener capable of dampening low frequency vibrations which is of such compact size and configuration as to readily permit exterior mounting of the dampener upon the members being dampened.

Another object of the invention is to provide a rotatable vibration dampener having low range tuning characteristics for dampening low frequencies, wherein the dampener components have high radial and axial stability.

It is another object of the invention to provide a vibration dampener having high radial stability wherein the radial stability between the hub and inertia members of the dampener increases as the torsional deflection between the hub and inertia members increases.

A further object of the invention is to provide a rotatable vibration dampener employing resilient vibration dampening means intermediate hub and inertia members wherein mechanical connection means are employed between the resilient vibration dampening means and the hub and inertia members.

Another object of the invention is to provide a rotatable vibration dampener wherein the tuning and construction characteristics may be varied by slight modifications of the elastic vibration dampening elements interposed between hub and inertia members.

An additional object of the invention is to provide a rotatable vibration dampener capable of dampening low frequency vibrations, which is of concise configuration and occupies very little of the space present below the frame of a vehicle.

Yet a further object of the invention is to provide a rotatable vibration dampener employing hub and inertia members maintained in assembled relationship by elastic vibration dampening elements wherein openings are provided within the vibration dampening elements to maintain consistency in the vibration dampening characteristics though the temperature of the dampener may vary.

Figure 3:
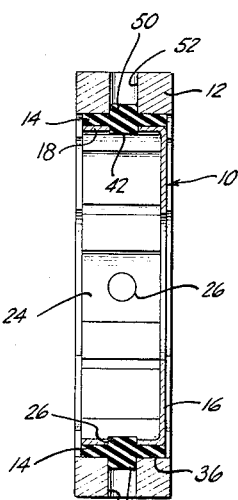
Figure 1:
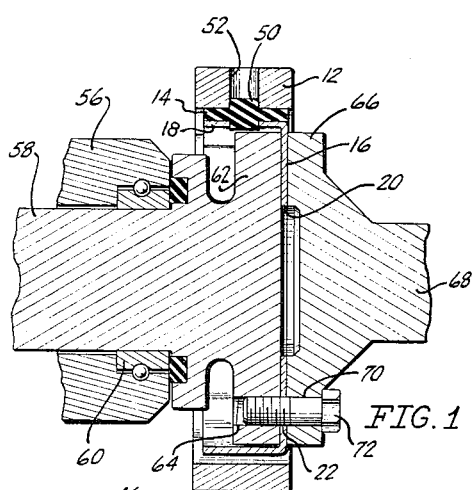
Figure 4:
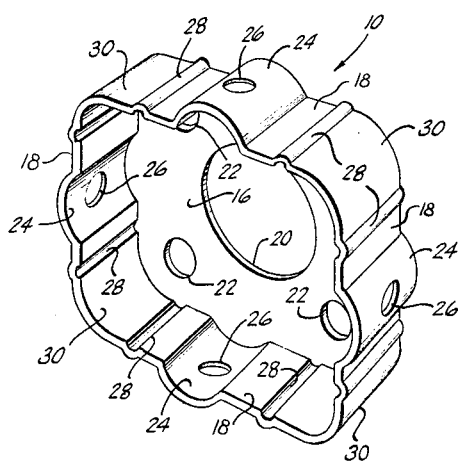
Figures 5, 6:
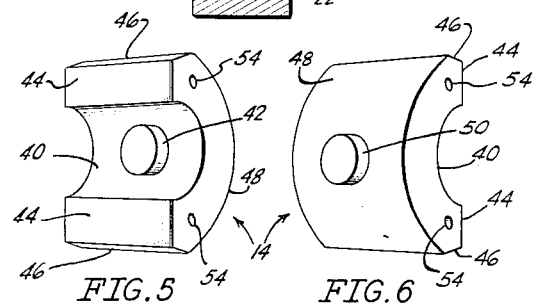

These and other objects of the invention arising from the details of components and the relationships thereof will be apparent from the following description and accompanying drawings wherein:

FIG. 1 is an elevational, sectional view of a typical installation of a vibration dampener in accord with the invention, the section of the vibration dampener, per se, being taken along section I—I of FIG. 2, FIG. 2 is an elevational view of a vibration dampener in accord with the invention, a detailed portion of a vibration dampener element, hub and inertia members being sectioned for purposes of illustration, FIG. 3 is an elevational, diametrical, sectional view of the vibration dampener in accord with the invention, as taken along section III—III of FIG. 2, FIG. 4 is a perspective view of a hub member employed in conjunction with the invention, FIG. 5 is a perspective view of the inner side of an elastic vibration dampener element, as employed with the dampener of FIGS 1 through 3, and FIG. 6 is a prespective of the outer side of the vibration dampening element of FIG. 5.

The vibration dampener in accord with the invention basically consists of a hub member 10 located within an annular inertia member 12. A plurality of resilient vibration dampening members or elements 14 is interposed between the hub and inertia members and maintains the assembly thereof. In the disclosed embodiment four resilient vibration dampening elements 14 are illustrated. However, it is to be appreciated that a greater or lesser number of vibration dampening elements may be employed within the scope of the invention.

As best illustrated in FIG. 4, the hub member 10 is of a cup-like configuration formed of a sheet material including a planar radial portion 16 having peripheral edges from which depend side or flange elements 18 located on a common side of the radial portion 16. The radial portion 16 may be provided with a central opening 20, and a plurality of evenly spaced holes 22 is also defined within the portion 16 for permitting mounting bolts to extend therethrough.

The side or flange elements 18 are disposed at right angles to the plane of the radial portion 16, FIGS. 1 and 5, and in the illustrated embodiment the peripheral configuration of the radial portion 16 is of a generally square form wherein each of the side elements 18 constitutes a side of the square form. Each of the side elements 18 includes a convex, arcuate, cylindrical portion 24 centrally located with respect to the associated side element. An opening 26 is provided within the convex portion 24 for cooperation with the resilient vibration dampening element, as will be later described. The side elements 18 are also each provided with an outwardly extending rib 28 disposed on each side of the convex portion 24. The ribs 28 are spaced from the convex portion 24 and are substantially parallel to the axis of the convex portion. Adjacent side elements 18 are connected by the corner arcuate portions 30 which serve to reinforce the side elements.

It will be appreciated that the hub member 10 is preferably formed of a sheet material by a drawing process whereby the side elements 18 are integral with the radial portion 16. The convex portion 24 and the ribs 28 are defined by a displacement of the material of the side elements, and during the drawing and forming of the hub member, the working of the material thereof will impart high strength characteristics to the hub member.

The configuration of the inertia member 12 will be best appreciated from FIGS. 2 and 3. The inertia member is of an annular ring form having a cylindrical exterior configuration. A central opening 32 is defined within the inertia member 12 of such dimension as to receive the hub member 10. The inertia member opening includes rectangularly related surfaces 38 interconnected by portions 34 which correspond in shape, but are of greater radial dimension than the corner portions 30 of the hub member, to provide clearance therewith. Concave, arcuate, cylindrical recesses 36 are defined within the surfaces 38 and are located in opposed radial relation to the hub member convex portions 24 upon assembly of the hub and inertia members. It is to be noted that the radius of the concave recesses 36, as apparent in FIG. 2, is greater than the radius of the exterior surface of the convex portions 24, and that the recesses 36 and the adjacent convex portions 24 are not concentric. The center of the convex portions 24 preferably lies intermediate the axis of rotation of the vibration dampener, as represented at C, and the associated convex portion. While the center of the recesses 36 also usually will lie intermediate the axis of rotation C and the associated concave recess, the center of the recesses 36 will lie closer to the axis C than that of the convex portions 24.

The resilient vibration dampening elements 14 are interposed between the convex portions 24, and the lateral regions thereof, and the radially opposed recesses 36. Preferably, the vibration dampening elements 14 are formed of a rubber or rubber-like material. As shown in FIGS. 5 and 6, the vibration dampening elements include on their inner side a concave, arcuate surface 40 substantially corresponding in configuration to the outer surface of the convex portions 24. A projection 42 of cylindrical configuration is integrally defined on the elements 14 extending from the surface 40 for a close fitting reception within the openings 26. The inner side of the elements also includes substantially planar lateral portions 44 for engaging the hub member side elements intermediate the convex portion 24 and the ribs 28. The elements 14 are relieved or beveled at 46, forming a locating surface which is adapted to abut against the ribs 28, thereby aiding in locating the vibration dampening element on the hub member and prevent shifting with respect thereto.

The outer surface of the vibration dampening elements 14 is of an arcuate, cylindrical, convex configuration substantially corresponding to the shape of the concave recesses 36. A cylindrical projection 50 integrally extends from the convex surface 48 for being received within the radially defined holes 52 formed in the annular inertia member 12 and intersecting each concave recess 36.

The hub and inertia members are assembled by locating the hub member 10 within the inertia member 12 so that the openings 26 are in alignment with the inertia member holes 52. The resilient vibration dampening elements 14 are then forced into the space between the convex portions 24 and the concave recesses 36. Upon alignment of the projections 42 and 50 with the holes 26 and 52, respectively, the projections will "snap" into the holes and the vibration dampening elements 14 will be properly located with respect to both the hub and inertia members and maintain the vibration dampener assembly.

Preferably, holes 54 are defined within the resilient elements 14, as will be apparent from FIGS. 2, 5, and 6. The holes 54 extend through the resilient elements 14 and aid in producing low frequency vibration dampening, as well as permit the dampener to remain "tuned" as the temperature of the dampener increases. The exact reason for the improved results produced by the holes 54 is not known. However, it is suspected that the holes aid in maintaining a more uniform temperature of the vibration element due to the circulation of air therethrough.

FIG. 1 illustrates a conventional installation of a vibration dampener in accord with the invention, wherein a vehicle differential is illustrated at 56 having a pinion gear shaft 58 rotatably supported by bearings 60 within the differential. The end of the shaft 58 constitutes a companion flange 62 having four threaded holes 64 defined therein, only one of which is shown. The drive line includes a companion flange 66 formed on the usual drive shaft universal joint 68, and four holes 70 are defined within the flange 66. The dimension of the hub member radial portion 16 is such as to permit the companion flange 62 to abut against the radial portion whereby the portion 16 may be "sandwiched" between the companion flanges 62 and 66, and bolts 72 extending through the flange holes 70 and threaded into the openings 64 establish a driving connection between the companion flanges 62 and 66, and simultaneously attach the vibration dampener to the drive line and shaft 58, wherein it may effectively dampen vibrations caused by gear teeth engagement and drive shaft vibrations.

Due to the dish-like configuration of the hub member 10, the vibration dampener does not adversely affect the spacing between the companion flanges 62 and 66, yet permits a vibration dampener of relatively large axial width, with respect to the axis of rotation of the shaft 58, to be employed without interfering with the conventional vehicle differential and drive line structure.

The configuration of the vibration dampening elements 14 and the nonconcentric relationship of the convex portions 24 and the recesses 36 produces a high degree of radial stability with respect to the mounting of the annular inertia member on the hub member. For instance, vibrations tending to cause a clockwise rotation of the hub member, FIG. 2, relative to the inertia member, cause the material of the vibration dampening element shown in section to be compressed in the area A. This compression, in addition to the compression in the area B, due to the configuration of the associated side element 18 occurring during clockwise rotation of the hub member relative to the inertia member, distributes the forces imposed on the hub member due to compression of the vibration dampening elements during operation. Of course, the reverse distribution of compressive forces imposed on the elements will occur when the hub member is tending to rotate counterclockwise with respect to the inertia member, FIG. 2. As relative torsional deflection between the hub and inertia members tends to compress the vibration dampening elements in the areas of A and B, the forces required to cause such torsional deflection increase as the torsional deflection increases between the hub and inertia members, thereby tending to effectively absorb vibrations of unusually high magnitude. In that the forces imposed on the vibration dampening elements 14 are compressive in nature, the vibration dampening element material will not be subjected to significant shear or tension forces which may tend to destroy the material and, thus, the vibration dampener in accord with the invention will have a long effective life.

To vary the range of vibrations absorbable by the vibration dampener in accord with the invention, elements 14 of different durometer reading and composition may be employed with a given set of inertia and hub members. In that the configuration of the vibration elements is such as to permit the elements to be formed from extrusions, the elements may be readily manufactured. Of course, it will be appreciated that the projections 42 and 50 are only one means whereby the elements 14 may be affixed to and positioned upon the hub and inertia members, and it is within the scope of the invention to mold or bond the elements 14 to the hub and inertia members, if desired.

Only a single embodiment of the invention has been illustrated, and it is appreciated that various modifications may occur to those skilled in the art without departing from the scope and spirit thereof, and it is intended that the invention be defined only by the scope of the following claims:

1. A rotatable vibration dampener comprising, in combination,
   (a) a hub member having an outer peripheral surface and an axis of rotation,
   (b) a plurality of convex, arcuate portions defined on said surface and radially projecting therefrom,
   (c) an annular inertia member having an inner surface,
   (d) concave recesses defined in said inertia member inner surface, said recesses having a greater radius than that of said convex portions,
   (e) the center of said convex portions lying intermediate the axis of rotation of said hub member and the associated convex portion,
   (f) a first opening defined in each of said convex portions,
   (g) second openings defined in said inertia member, a second opening intersecting each recess,
   (h) resilient vibration dampening means interposed between said convex portions and recesses upon placing said hub member within said inertia member wherein each convex portion is in radial alignment with a recess, and
   (i) a pair of radially extending projections defined on said vibration dampening means, one of said projections being received within said first opening and the other projection being received within said second opening.

2. In a rotatable vibration dampener comprising, in combination,
   (a) a hub member having an outer peripheral surface and an axis of rotation,
   (b) a plurality of convex, arcuate portions defined on said surface and radially projecting therefrom,
   (c) an annular inertia member having an inner surface,
   (d) concave recesses defined in said inertia member inner surface, said recesses having a greater radius than that of said convex portions,
   (e) the center of said convex portions lying intermediate the axis of rotation of said hub member and the associated convex portion,
   (f) vibration dampener elements interposed between said convex portions and recesses upon placing said hub member within said inertia member wherein each convex portion is in radial alignment with a recess, said elements being of an arcuate configuration having an inner concave surface and an outer convex surface, said resilient element concave surface corresponding to the convex configuration of said hub member convex portions and said convex surface corresponding to the concave configuration of said recesses,
   (g) a first opening defined in each of said convex portions,
   (h) second openings defined in said inertia member, a second opening intersecting each recess, and
   (i) a pair of radially extending projections defined on said vibration dampening means.

3. A rotatable vibration dampener comprising, in combination,
   (a) a hub member having an axis of rotation,
   (b) convex, arcuate portions defined on said hub member having a radius center lying between said axis of hub member rotation and the associated convex portion,
   (c) an inertia member having an opening defined therein adapted to receive said convex, arcuate portions of said hub member,
   (d) a plurality of concave recesses defined in said inertia member intersecting said opening, a recess adapted to be located in opposed radially spaced relation to each convex, arcuate portion, said recesses having a radius greater than that of said convex portions,
   (e) a resilient vibration dampening member interposed between each opposed convex portion and concave recess.
   (f) a radially extending rib defined on said hub member on each lateral side of a convex portion and spaced from the associated convex portion, and
   (g) end surfaces defined on said resilient vibration dampening elements, an end surface adapted to engage a rib in abutting relationship.

4. A rotatable vibration dampener comprising, in combination,
   (a) a hub member having an outer peripheral surface and an axis of rotation,
   (b) a plurality of convex, arcuate portions defined on said surface and radially projecting therefrom,
   (c) an annular inertia member having an inner surface,
   (d) concave recesses defined in said inertia member inner surface, said recesses having a greater radius than that of said convex portions,
   (e) the center of said convex portions lying intermediate the axis of rotation of said hub member and the associated convex portion,
   (f) resilient vibration dampening means interposed between said convex portions and recesses upon placing said hub member within said inertia member wherein each convex portion is in radial alignment with a recess, said vibration dampener means comprising resilient elements of arcuate configuration having an inner concave surface and an outer convex surface, said resilient element concave surface corresponding to the convex configuration of said hub member convex portions and said convex surface corresponding to the concave configuration of said recesses, and
   (g) holes defined in said resilient elements extending in a direction transverse to the direction of compressive forces imposed on said elements during vibration dampening.

5. A rotatable vibration dampener comprising, in combination,
   (a) a hub member having an outer periphery of non-circular configuration and an axis of rotation, said periphery including a plurality of surfaces each having a central portion and end portions,
   (b) a convex, arcuate portion defined on each of said surfaces central portion and radially projecting therefrom,
   (c) an annular inertia member having an inner surface,
   (d) concave recesses defined in said inertia member inner surface, said recesses having a greater radius than that of said convex portions, said hub member surface end portions being of such configuration and so related to said axis of rotation and the associated convex arcuate portion that the trailing end portion relative to the direction of relative angular movement between said hub and inertia members when said hub member is within said inertia member radially approaches the associated recess, and
   (e) resilient vibration dempening means interposed between said convex portions and recesses upon placing said hub member within said inertia member wherein each convex portion is in radial alignment with a recess, relative rotation of said hub member relative to said inertia member in a given direction placing the resilient vibration dampening means within each recess in compression on both sides of said convex arcuate portions relative to the direction of vibration dampener rotation.

6. In a rotatable vibration dampener as in claim 5 wherein,
 (a) said hub member periphery surfaces are substantially planar in configuration.

References Cited by the Examiner

UNITED STATES PATENTS

| | | | |
|---|---|---|---|
| 1,649,426 | 11/1927 | Van Raust | 74—574 |
| 2,828,616 | 4/1958 | Zeigler et al. | 64—27 |
| 3,058,321 | 10/1962 | Aske | 64—11 |

BROUGHTON G. DURHAM, *Primary Examiner.*

WESLEY S. RATLIFF, JR., *Assistant Examiner.*